(12) United States Patent
Miyazawa et al.

(10) Patent No.: US 9,710,159 B2
(45) Date of Patent: Jul. 18, 2017

(54) INFORMATION PROCESSING APPARATUS, INFORMATION PROCESSING METHOD, AND COMPUTER PROGRAM PRODUCT

(75) Inventors: Yusuke Miyazawa, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 105 days.

(21) Appl. No.: 13/196,963

(22) Filed: Aug. 3, 2011

(65) Prior Publication Data

US 2012/0054654 A1    Mar. 1, 2012

(30) Foreign Application Priority Data

Aug. 25, 2010 (JP) ................................ 2010-188126

(51) Int. Cl.
*G06F 3/0488* (2013.01)
(52) U.S. Cl.
CPC ................ *G06F 3/04886* (2013.01)
(58) Field of Classification Search
CPC ............................ G06F 3/0481; G06F 3/0482
USPC .......................................................... 715/767
See application file for complete search history.

(56) References Cited

U.S. PATENT DOCUMENTS

| 7,444,163 | B2 * | 10/2008 | Ban ....................... | G06F 1/1616 345/168 |
| 8,081,170 | B2 * | 12/2011 | Ko ....................... | G06F 3/04886 345/173 |
| 8,194,002 | B2 * | 6/2012 | Sanders-Reed ...... | G01C 23/005 345/7 |
| 8,232,973 | B2 * | 7/2012 | Kocienda .............. | G06F 3/0237 345/168 |
| 2002/0163547 | A1 | 11/2002 | Abramson et al. | |
| 2005/0268254 | A1 | 12/2005 | Abramson et al. | |
| 2006/0038789 | A1 * | 2/2006 | Ban ....................... | G06F 1/1616 345/169 |
| 2006/0055628 | A1 * | 3/2006 | Sanders-Reed ...... | G01C 23/005 345/8 |
| 2006/0161846 | A1 | 7/2006 | Van Leeuwen | |
| 2007/0209016 | A1 * | 9/2007 | Takayama ............. | G06F 3/0236 715/780 |
| 2008/0141149 | A1 | 6/2008 | Yee et al. | |

(Continued)

FOREIGN PATENT DOCUMENTS

| JP | 2004-054854 | 2/2004 |
| JP | 2009-116583 | 5/2009 |
| WO | WO 2004/051392 A2 | 6/2004 |

OTHER PUBLICATIONS

U.S. Appl. No. 13/190,854, filed Jul. 26, 2011, Ohki, et al.
Extended European Search Report issued Jan. 9, 2012 in patent application No. 11177551.6.

*Primary Examiner* — David Choi
(74) *Attorney, Agent, or Firm* — Oblon, McClelland, Maier & Neustadt, L.L.P.

(57) ABSTRACT

An information processing apparatus detects an interaction area of a position detection surface specified by a manipulation object. A focused target extraction unit that extracts at least some of a plurality of focused targets on the basis of the interaction area. A selection candidate extraction unit extracts a selection candidate from the plurality of focused targets, and a display displays at least some of the plurality of focused targets, and emphasizes the selection candidate. Furthermore, a method and non-transitory computer readable storage device cooperate to provide a corresponding process.

17 Claims, 14 Drawing Sheets

(56) References Cited

U.S. PATENT DOCUMENTS

| | | | | |
|---|---|---|---|---|
| 2008/0297482 A1* | 12/2008 | Weiss | G06F 3/04883 | 345/173 |
| 2009/0058823 A1* | 3/2009 | Kocienda | G06F 3/0236 | 345/173 |
| 2009/0174667 A1* | 7/2009 | Kocienda | G06F 3/0237 | 345/169 |
| 2009/0193361 A1* | 7/2009 | Lee | G06F 3/04886 | 715/810 |
| 2009/0231291 A1* | 9/2009 | Ko | G06F 3/04886 | 345/173 |
| 2009/0259966 A1* | 10/2009 | Hara | G06F 3/0481 | 715/796 |
| 2009/0281719 A1* | 11/2009 | Jakobson | G01C 21/3682 | 701/439 |
| 2010/0013852 A1* | 1/2010 | Liu | G06F 3/04886 | 345/592 |
| 2010/0085469 A1* | 4/2010 | Takemasa | H04N 5/232 | 348/345 |
| 2010/0138796 A1 | 6/2010 | Abramson et al. | | |
| 2010/0223577 A1* | 9/2010 | Bennett | G06F 3/0481 | 715/800 |
| 2010/0235726 A1* | 9/2010 | Ording | G06F 1/1626 | 715/234 |
| 2010/0235729 A1* | 9/2010 | Kocienda | G06F 1/1626 | 715/255 |
| 2010/0235734 A1* | 9/2010 | Ording | G06F 1/1626 | 715/702 |
| 2010/0235735 A1* | 9/2010 | Ording | G06F 1/1626 | 715/702 |
| 2010/0235770 A1* | 9/2010 | Ording | G06F 1/1626 | 715/765 |
| 2010/0235778 A1* | 9/2010 | Kocienda | G06F 1/1626 | 715/781 |
| 2010/0235783 A1* | 9/2010 | Ording | G06F 1/1626 | 715/810 |
| 2010/0235784 A1* | 9/2010 | Ording | G06F 1/1626 | 715/810 |
| 2010/0235785 A1* | 9/2010 | Ording | G06F 1/1626 | 715/810 |
| 2010/0235793 A1* | 9/2010 | Ording | G06F 1/1626 | 715/863 |
| 2010/0257478 A1* | 10/2010 | Longe | G06F 3/0237 | 715/773 |
| 2010/0259464 A1* | 10/2010 | Chang | G06F 3/1454 | 345/2.3 |
| 2010/0259561 A1* | 10/2010 | Forutanpour | G06F 3/0216 | 345/660 |
| 2010/0261508 A1* | 10/2010 | Chang | G06F 3/1454 | 455/566 |
| 2010/0295798 A1* | 11/2010 | Nicholson | G06F 3/044 | 345/173 |
| 2010/0309147 A1* | 12/2010 | Fleizach | G06F 3/04883 | 345/173 |
| 2010/0309148 A1* | 12/2010 | Fleizach | G06F 3/04883 | 345/173 |
| 2010/0313125 A1* | 12/2010 | Fleizach | G06F 3/04883 | 715/702 |
| 2011/0161861 A1 | 6/2011 | Abramson et al. | | |
| 2011/0161872 A1 | 6/2011 | Abramson et al. | | |
| 2011/0175832 A1 | 7/2011 | Miyazawa et al. | | |
| 2012/0032895 A1* | 2/2012 | Westerman | G06F 3/044 | 345/173 |
| 2012/0054654 A1* | 3/2012 | Miyazawa | G06F 3/04886 | 715/767 |
| 2012/0249592 A1* | 10/2012 | Sanders-Reed | G01C 23/005 | 345/633 |

* cited by examiner

FIG.11
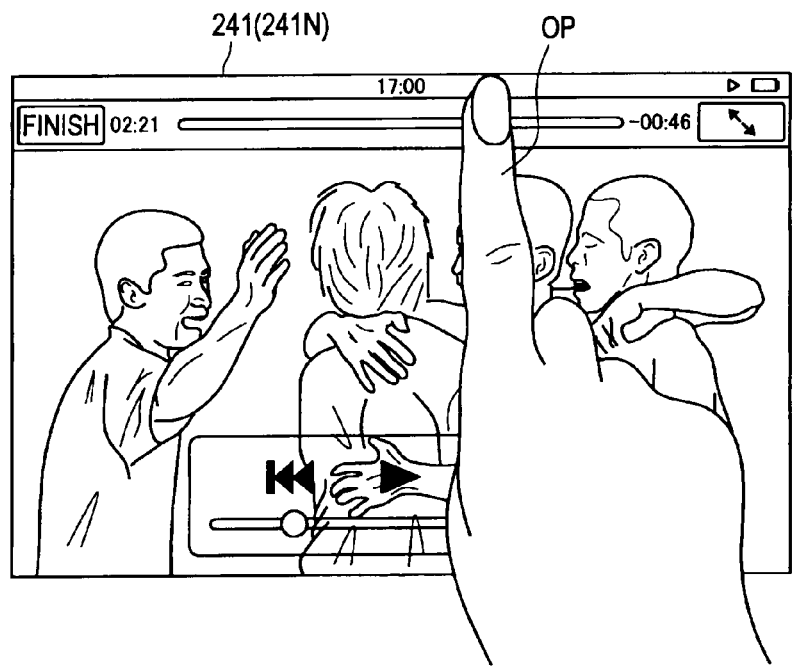
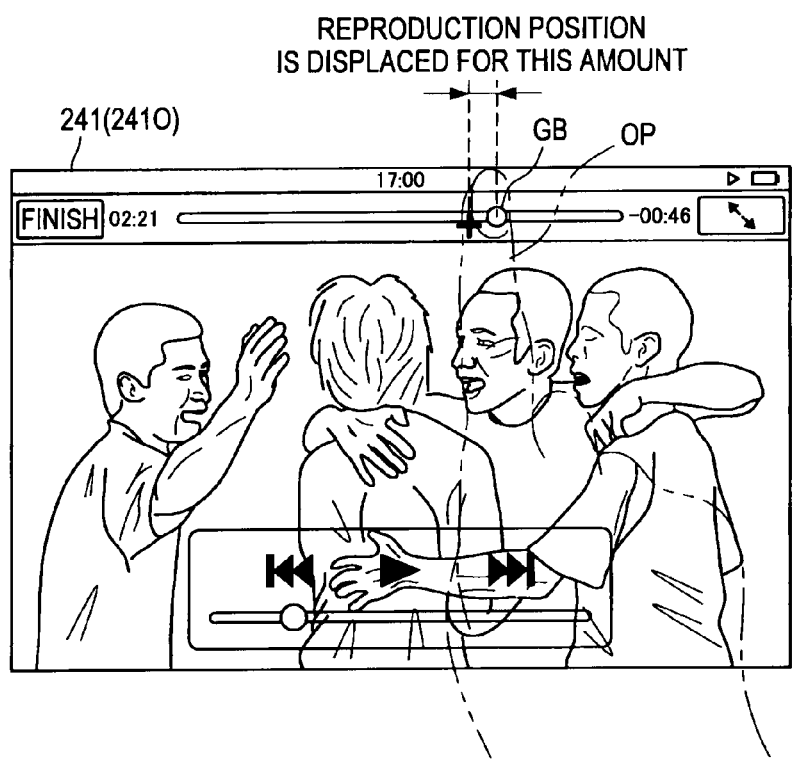

FIG.12
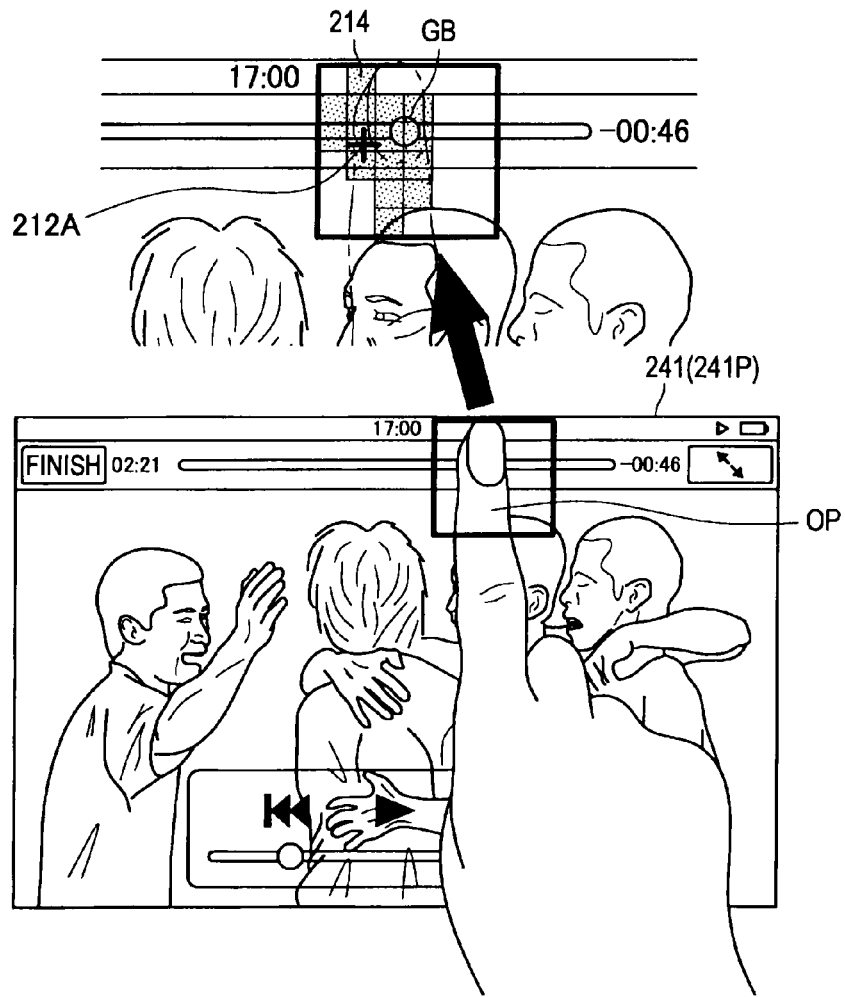
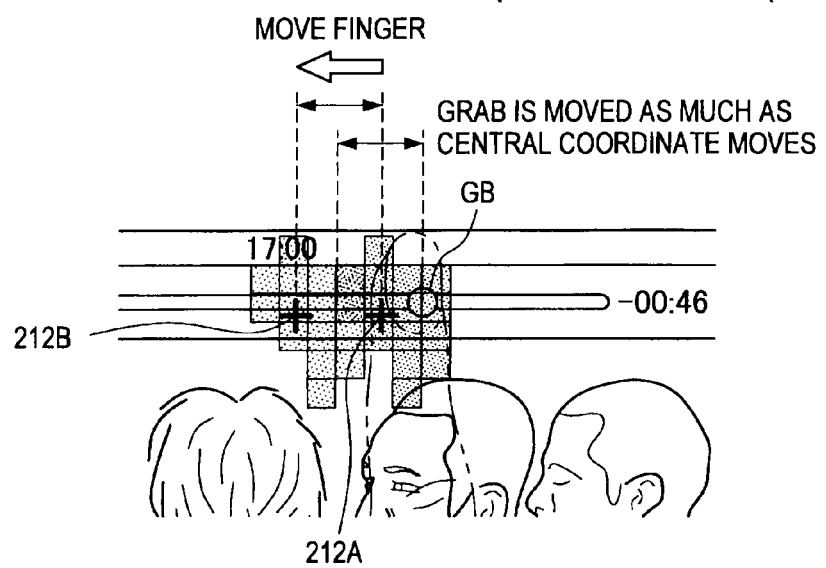

INFORMATION PROCESSING APPARATUS, INFORMATION PROCESSING METHOD, AND COMPUTER PROGRAM PRODUCT

BACKGROUND

The present disclosure relates to an information processing apparatus, an information processing method, and a computer program product.

In recent years, devices having touch panels are widely available. When a user uses a device having a touch panel, the user can enjoy intuitive operation by touching a screen. Therefore, it is considered that the reason why such devices come into wide use is that the size of the display region can be increased with respect to the size of the device. Moreover, the resolution of the screen such as a liquid crystal display screen is increased so that the device displays as much information as possible in the limited display region.

However, the display region needs to have a certain size of area so as to allow a user to perform touch operation even when the resolution of the screen is increased. For this reason, when the size of the display region is increased, the high resolution screen may not be sufficiently utilized in view of the cost and the like. For the same reason, the device for which touch operation is necessary needs to have a certain physical size, and therefore, it is difficult to incorporate such device into a small mobile device.

In order to improve such situation, for example, Japanese Patent Application Laid-Open No. 2004-54854 suggests a technique for sorting options in proximity to a pen with which a position on a touch panel is specified. When this technique is used, the options move to a position where one of them can be selected with the pen. Therefore, even when the displayed options are concentrated in a small display region, one of the options can be selected.

For example, Japanese Patent Application Laid-Open No. 2009-116583 suggests a technique for enlarging/displaying or focusing/displaying an option at a position closest to the position of the finger that is brought into proximity. When this technique is used, the focus can be switched by a slightly-changed coordinate specified with the finger.

SUMMARY

However, for example, in the technique suggested in Japanese Patent Application Laid-Open No. 2004-54854 explained above, it is necessary to rearrange the options. Therefore, there is an issue in that it takes much time for a user to understand the relationship before and after the sorting. For example, in the technique suggested in Japanese Patent Application Laid-Open No. 2009-116583 explained above, it is necessary to select one of the options while a finger is released from the display unit. Therefore, a majority of the display region is covered by the finger, and there is an issue in that the limited area in the display region may not be efficiently utilized.

In light of the foregoing, it is desirable to provide a novel and improved technique capable of allowing a user to select a desired option from among a plurality of options in a display region while effectively making use of the limited display region.

In one embodiment, an information processing apparatus, includes a specified region detection unit that detects an interaction area of a position detection surface specified by a manipulation object; a focused target extraction unit that extracts at least some of a plurality of focused targets based on the interaction area; a selection candidate extraction unit that extracts a selection candidate from the plurality of focused targets; and a display that displays at least some of the plurality of focused targets, and emphasizes the selection candidate relative to other of the plurality of focused targets.

One aspect of the apparatus is that the display is incorporated into a wireless mobile terminal; and the plurality of focused targets include keys of a software keyboard.

Another aspect is that the plurality of focused targets are keys of the software keyboard that fall within a footprint of the interaction area.

A further aspect is that the display displays the plurality of focused targets in a display area that does not overlap the keys of the wireless keyboard.

Furthermore, the display displays the selection candidate as an emphasized alphanumeric character, as compared to other of plurality of focused candidates.

In another aspect, the emphasis on the selection candidate changes to a different alphanumeric character in response to the selection candidate extraction unit detecting a change in position of the manipulation object with respect to the interaction area.

Additionally, a proximity of the selection candidate to the different alphanumeric character is related to an amount of movement of the manipulation object with respect to the interaction area.

The display may include the position detection surface, and the specified region detection unit detects pressure from the manipulation object when contacted by the manipulation object.

As another aspect, the specified region detection unit is responsive to change in capacitance.

Optionally, the selection candidate extraction unit selects the selection candidate by relative proximity to a central coordinate barycentric point caused by the manipulation object relative to the position detection surface.

The selection candidate is optionally emphasized by at least one of an insertion-point cursor and bold text.

Optionally, the display is incorporated into an electronic map device; and the plurality of focused targets include geographic features within a displayed geographic area.

The selection candidate may be emphasized by at least one of color, scale, pin and geometric marker.

One aspect is that when the manipulation object covers from sight one or more keys of the software keyboard, the display displays the at least some of the plurality of focused targets in a display region of the display that is not covered by the manipulation object.

An exemplary method includes detecting an interaction area of a position detection surface specified by a manipulation object; extracting with a computer processor at least some of a plurality of focused targets on the basis of the interaction area; extracting a selection candidate from the plurality of focused targets; and displaying on a display at least some of the plurality of focused targets, and emphasizing the selection candidate on the display relative to other of the plurality of focused targets.

An optional feature is that the display is incorporated into a wireless mobile terminal; and the plurality of focused targets include keys of a software keyboard.

Optionally, the display is incorporated into an electronic map device; and the plurality of focused targets include geographic features within a predetermined geographic area.

In a non-transitory computer readable storage device embodiment, which has ha stored therein computer readable instructions, execution of the instructions by a computer processor perform a process that includes detecting an interaction area of a position detection surface specified by a manipulation object; extracting with the computer processor at least some of a plurality of focused targets on the basis of the interaction area; extracting a selection candidate from the plurality of focused targets; and displaying on a display at least some of the plurality of focused targets, and emphasizing the selection candidate on the display relative to other of the plurality of focused targets.

Once aspect is that the display is incorporated into a wireless mobile terminal; and the plurality of focused targets include keys of a software keyboard.

As described above, according to the present disclosure, a user can select a desired option from among a plurality of options in a display region while effectively making use of the limited display region.

BRIEF DESCRIPTION OF THE DRAWINGS

FIG. 11 is a view illustrating functions of a generally-available information processing apparatus serving as a basis of an information processing apparatus according to a second embodiment of the present disclosure;

FIG. 12 is a view illustrating the functions of the information processing apparatus according to the embodiment;

DETAILED DESCRIPTION OF THE EMBODIMENT(S)

Figure 1:
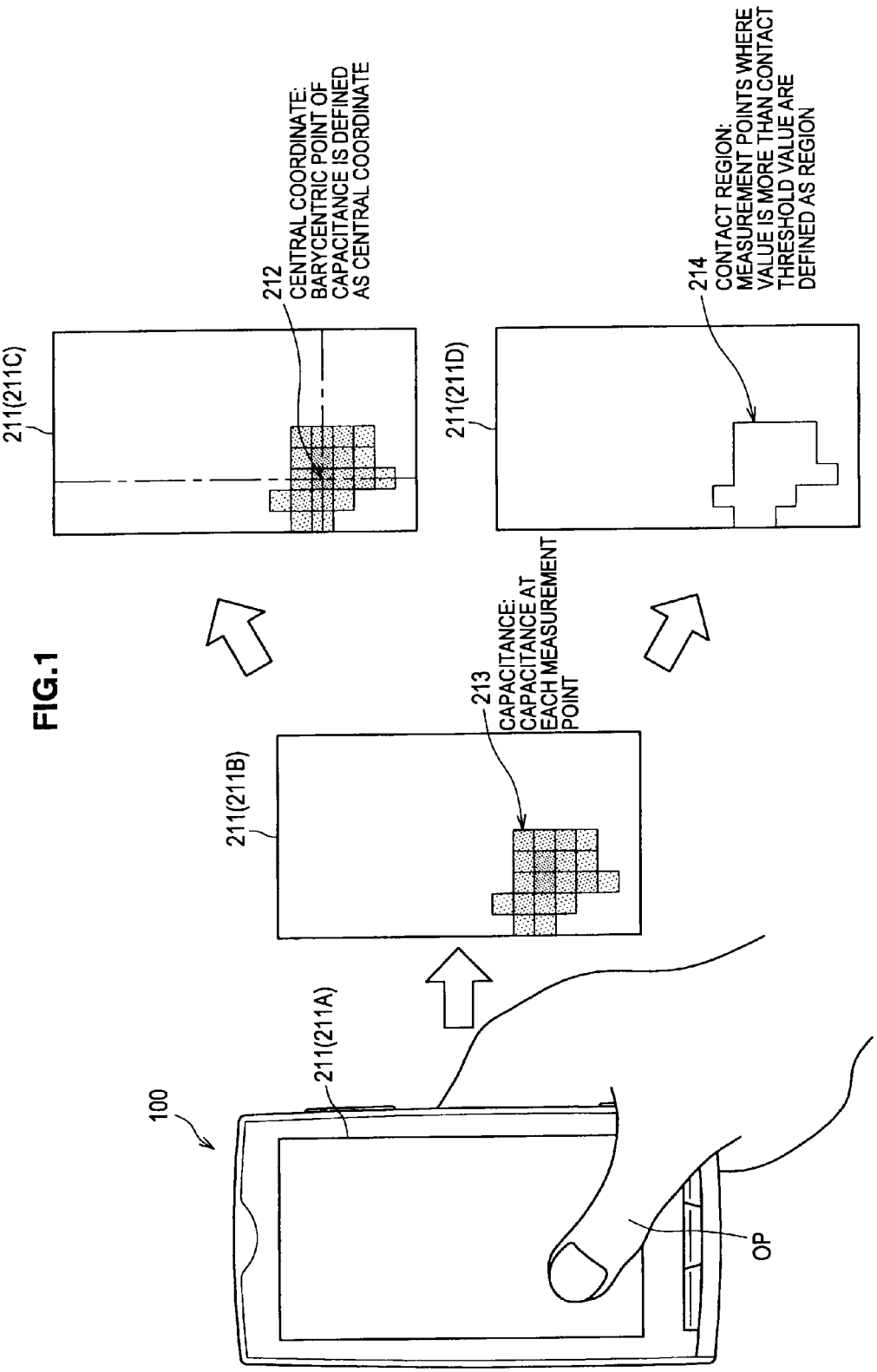
FIG. 1 is a view illustrating a principle based on which an information processing apparatus according to a first embodiment of the present disclosure extracts a specified region and a central coordinate of the specified region.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

DETAILED DESCRIPTION OF THE EMBODIMENT(S) will be hereinafter described in the order listed below.

1. First Embodiment
1-1. Principle for extracting specified region and central coordinate of specified region
1-2. Key input operation with software keyboard
1-3. Functional configuration of information processing apparatus
1-4. Hardware configuration diagram illustrating information processing apparatus
1-5. Example of display after manipulation object is moved
1-6. Example of display during key input operation
1-7. Flow of operation performed by information processing apparatus (when key input operation is performed)
1-8. Pin selection operation on map
1-9. Example of display that changes according to position of manipulation object
1-10. Flow of operation performed by information processing apparatus (when pin is selected on map)
2. Second embodiment
2-1. Functions of generally-available information processing apparatus serving as basis
2-2. Functions of information processing apparatus
2-3. Functional configuration of information processing apparatus
2-4. Flow of operation performed by information processing apparatus (preventing malfunction)
3. Modification
4. Conclusion 1. First Embodiment 1-1. Principle for Extracting Specified Region and Central Coordinate of Specified Region FIG. 1 is a view illustrating a principle based on which an information processing apparatus according to a first embodiment of the present disclosure extracts focused targets and a selection candidate from a plurality of options. As shown in FIG. 1, an information processing apparatus 100A according to the first embodiment of the present disclosure has a position detection surface 211A for detecting a position of a manipulation object OP. For example, when the position detection surface 211A is made of an electrostatic touch panel, the degree of proximity of the manipulation object OP with respect to the position detection surface 211A is measured as a change of capacitance on the surface of the position detection surface 211A. A position detection surface 211B shows that the capacitance of the position detection surface 211B is changed by the manipulation object OP that comes into contact with or in proximity to the position detection surface 211B. In the explanation below, the change of the capacitance means, for example, the change of a value with respect to a state where the manipulation object OP is not in proximity to the position detection surface 211.

In this case, the information processing apparatus 100A according to the first embodiment of the present disclosure extracts, as a contact region 214, a region in which a change of capacitance at each measurement point is more than a threshold value (for example, contact threshold value) from the position detection surface 211D. The contact region 214 is an example of a specified region explained later. Therefore, in the explanation below, the specified region may be substituted for the contact region 214. In this case, the threshold value is defined as the change of the capacitance when the manipulation object OP is in contact with the position detection surface 211, and a region in which the manipulation object OP is in contact with the position detection surface 211 is extracted as the contact region 214. Alternatively, the threshold value may be defined as the change of the capacitance when the manipulation object OP is in proximity to the position detection surface 211. In this case, the information processing apparatus 100A can extract, as the specified region, a region in which the manipulation object OP is in proximity to the position detection surface 211. For example, the contact region 214 is used to extract focused targets explained later.

In this case, the information processing apparatus 100A uses the electrostatic touch panel to measure the degree of proximity of the manipulation object OP with respect to the position detection surface 211. However, the used touch panel is not limited to the electrostatic touch panel. For example, an optical touch panel and the like may be used to measure the degree of proximity. In this case, the information processing apparatus 100A extracts a region in which the degree of proximity is more than the threshold value as the specified region. However, the degree of proximity to the position detection surface 211 does not have to be measured. For example, when the information processing apparatus 100A can detect the manipulation object OP being in contact with the position detection surface 211, the information processing apparatus 100A can extract the specified region detected as being in contact with the manipulation object OP.

The information processing apparatus 100A can calculate a central coordinate 212 from, for example, the contact region 214. For example, the information processing apparatus 100A can calculate, as the central coordinate 212, a barycentric point of a capacitance 213 from among the measurement points on the position detection surface 211C. However, the information processing apparatus 100A can also calculate the central coordinate 212 using other methods. For example, a coordinate where the capacitance 213 changes the greatest may be calculated as the central coordinate 212. Alternatively, the coordinate of the barycentric point of the contact region 214 may be calculated as the central coordinate 212 without considering the degree of proximity such as of the capacitance 213. The central coordinate 212 is used to extract, for example, a selection candidate explained later.

According to the above control, the information processing apparatus 100A can extract the contact region 214 and the central coordinate 212.

1-2. Key Input Operation with Software Keyboard

Figure 2:
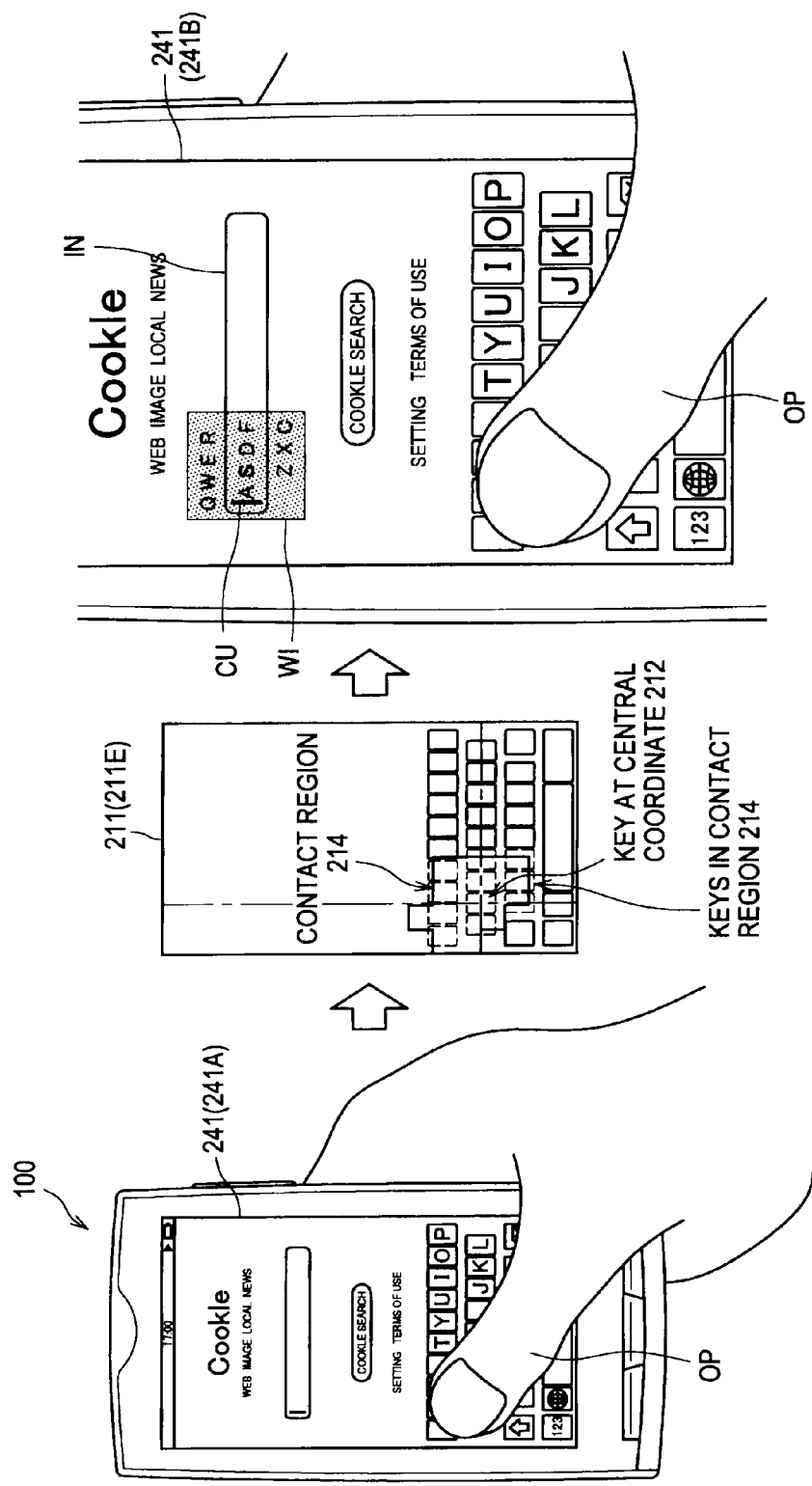
FIG. 2 is a view illustrating an example where the information processing apparatus according to the embodiment is applied to key input operation with a software keyboard.

FIG. 2 is a view illustrating an example where the information processing apparatus 100A according to the first embodiment of the present disclosure is applied to key input operation with a software keyboard, on a mobile electronic device, such as a wireless mobile terminal. As shown in FIG. 2, a user is trying to perform key input operation with a manipulation object OP using a software keyboard displayed in a display region 241A of the information processing apparatus 100A. When the user brings the manipulation object OP into contact with or in proximity to a position detection surface 211E, the information processing apparatus 100A extracts the contact region 214 and the central coordinate 212. The position detection surface 211 and the display region 241 are provided on the information processing apparatus 100A in an overlapping manner. Correspondence between overlapping positions of the position detection surface 211 and the display region 241 is managed in the information processing apparatus 100A. Therefore, each position that overlaps in the position detection surface 211 and the display region 241 is recognized as a corresponding position by the information processing apparatus 100A.

The information processing apparatus 100A can extract keys, e.g., "Q", "W", "E", "R", "A", "S", "D", "F", "Z", "X", "C" (examples of alphanumeric characters) included in the contact region 214 as focused targets. The contact region may also be construed as a covered region that covers the keys within the footprint of the portion of the user's finger, or other manipulation object, that interacts with the display. Further, the information processing apparatus 100A can extract a key, e.g., "S" at a position of the central coordinate 212 as a selection candidate. The information processing apparatus 100A can display, for example, the keys extracted as the focused targets in such a manner that they are displayed separately from the keys to be pressed by a user. In a display region 241B, the keys "Q", "W", "E", "R", "A", "S", "D", "F", "Z", "X", "C" extracted as the focused targets are displayed in a window WI by the information processing apparatus 100A.

As shown in the display region 241B, the information processing apparatus 100A can display a key, e.g., "S", extracted as a selection candidate in such a manner that the key "S" is more conspicuous (or emphasized with, eg., color, scale, cursor, or geometric marker) than the other keys "Q", "W", "E", "R", "A", "D", "F", "Z", "X", "C" extracted as the focused targets. In the display region 241B, an input field IN is placed. When selection operation is performed with the manipulation object OP, the key "S" extracted as a selection candidate is input to a position of a cursor CU. The cursor CU represents an input portion in the input field IN. For example, a pressure sensor is superimposed in the display region 241, and the information processing apparatus 100A may determine whether selection operation is performed or not in accordance with pressing force applied by the manipulation object OP and detected by the pressure sensor.

1-3. Functional Configuration of Information Processing Apparatus

Figure 3:
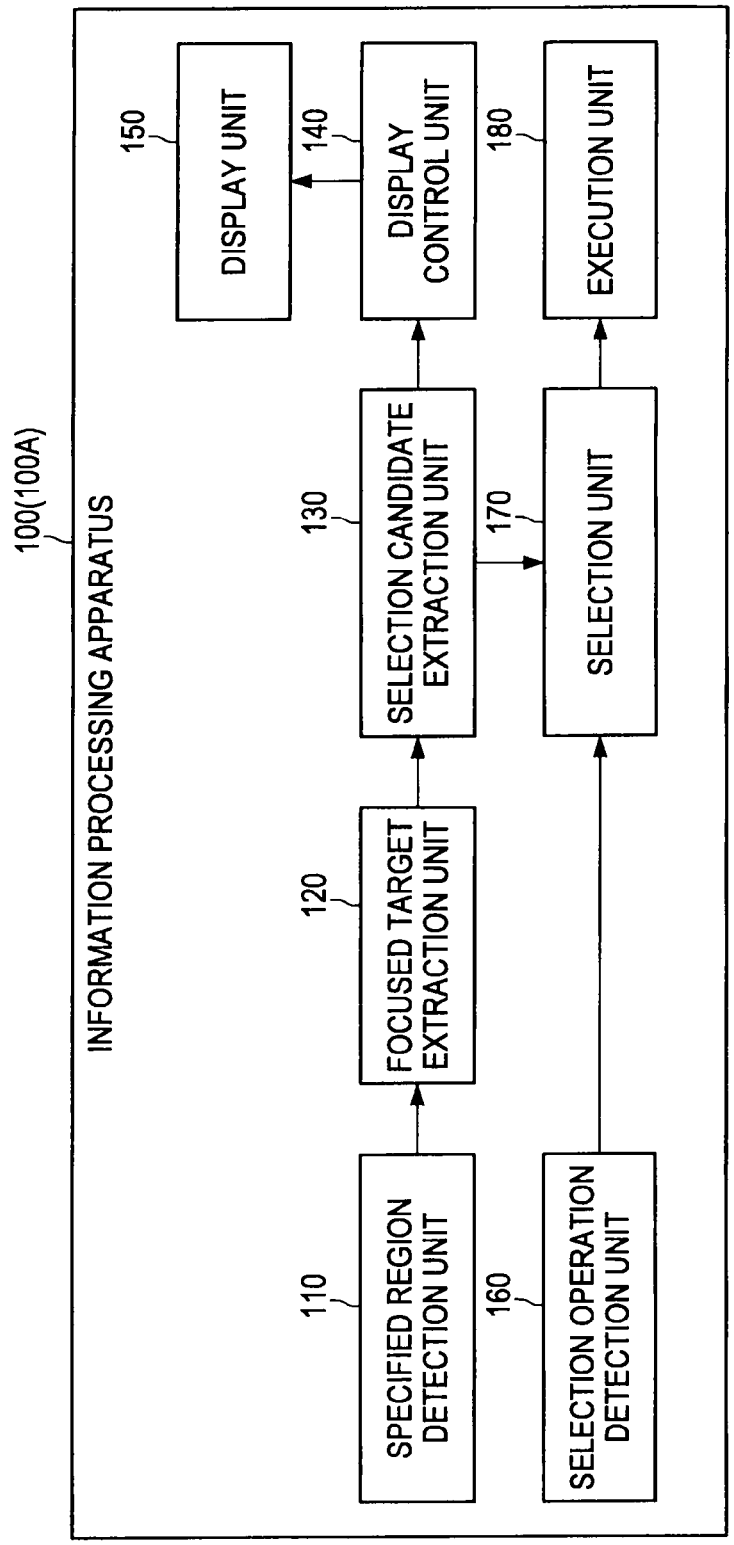
FIG. 3 is a view illustrating a functional configuration of the information processing apparatus according to the embodiment.

FIG. 3 is a view illustrating a functional configuration of the information processing apparatus according to the first embodiment of the present disclosure. The information processing apparatus 100A according to the first embodiment of the present disclosure includes at least a specified region detection unit 110, a focused target extraction unit 120, a selection candidate extraction unit 130, and a display control unit 140.

The specified region detection unit 110 includes a position detection device 210, and has a function of detecting a region in the display region 241 that is specified with the manipulation object OP as a specified region (for example, contact region 214). As described above, the specified region detection unit 110 detects, for example, the region specified with the manipulation object OP on the basis of a predetermined parameter that changes according to the degree of proximity of the manipulation object OP with respect to the position detection surface 211A.

The focused target extraction unit 120 has a function of extracting, as a plurality of focused targets, some or all of options in the display region 241 on the basis of the specified region (for example, contact region 214) detected by the specified region detection unit 110. In the example of the software keyboard as explained above, the options correspond to keys shown on the keyboard. In the example of the software keyboard as explained above, the focused targets correspond to keys such as "Q", "W", "E", "R", "A", "S", "D", "F", "Z", "X", "C".

As explained above with reference to FIG. 2, the focused target extraction unit 120 can extract, as a plurality of focused targets, keys such as "Q", "W", "E", "R", "A", "S", "D", "F", "Z", "X", "C", i.e., the plurality of options in the specified region (for example, contact region 214) detected by the specified region detection unit 110. However, the method for extracting the focused targets is not limited to the above examples. For example, a predetermined number of options may be extracted as a plurality of focused targets from a plurality of options in the specified region (for example, contact region 214) detected by the specified region detection unit 110.

For example, when the number of options is defined as five in advance, five options (for example, "W", "A", "S", "D", "Z") may be extracted as a plurality of focused targets from the plurality of options, i.e., the keys "Q", "W", "E", "R", "A", "S", "D", "F", "Z", "X", "C", in the specified region (for example, contact region 214) detected by the specified region detection unit 110. The predetermined number of options are extracted by selecting the options in ascending order of, for example, distance to the central coordinate 212 until the predetermined number of options are selected.

The focused target extraction unit 120 may calculate a determination region on the basis of the specified region (for example, contact region 214) detected by the specified region detection unit 110, and extract a plurality of options in the determination region as a plurality of focused targets. The focused target extraction unit 120 may calculate, for example, a predetermined-shaped region included in the specified region or a predetermined-shaped region including the specified region as a determination region. The predetermined shape may be a rectangle, a circle, or an ellipse. The predetermined shape is not particularly limited. The focused target extraction unit 120 may calculate, for example, the maximum region among predetermined-shaped regions included in the specified region or the maximum region among predetermined-shaped regions including the specified region as a determination region.

The selection candidate extraction unit 130 has a function of extracting a selection candidate from the plurality of focused targets extracted by the focused target extraction unit 120. There are various methods for extracting a selection candidate from the plurality of focused targets. The method for extracting a selection candidate is not particularly limited. For example, the selection candidate extraction unit 130 calculates the coordinate of the barycentric point as the central coordinate 212 on the basis of a predetermined parameter that changes according to the degree of proximity of the manipulation object OP with respect to the position detection surface 211, and thus capable of extracting a selection candidate on the basis of the calculated central coordinate 212.

It should be noted that the selection candidate extraction unit 130 may calculate, as the central coordinate 212, a coordinate at which the predetermined parameter changes most greatly, and may extract a selection candidate on the basis of the calculated central coordinate 212. Alternatively, the selection candidate extraction unit 130 may calculate the coordinate of the barycentric point of the contact region 214 as the central coordinate 212 without considering the degree of proximity, and extract a selection candidate on the basis of the calculated central coordinate 212. For example, the selection candidate extraction unit 130 can extract, as a selection candidate, a focused target at the position closest to the calculated central coordinate 212.

The display control unit 140 has a function of performing control so as to display the plurality of focused targets extracted by the focused target extraction unit 120 in the display region 241, and emphasize and display the selection candidate extracted by the selection candidate extraction unit 130 in the display region 241. As explained with reference to the display region 241B in FIG. 2, the display control unit 140 performs control so as to display the key "S" extracted as the selection candidate in such a manner that the key "S" is more conspicuous than the other keys "Q", "W", "E", "R", "A", "D", "F", "Z", "X", "C" extracted as the focused targets, so that the control can be performed in such a manner that the selection candidate is emphasized in the display in the display region 241.

However, the method for emphasizing the selection candidate is not particularly limited. For example, the key "S" may be emphasized in the bold letter like the one shown as the selection candidate in the display region 241B of FIG. 2. Alternatively, it may be blinked to be emphasized. Still alternatively, it may be emphasized and displayed in a color different from the color of the other keys extracted as the focused targets.

Further, when the display control unit 140 performs control so as to display the plurality of focused targets extracted by the focused target extraction unit 120 in the display region 241, the display control unit 140 may arrange the plurality of focused targets in the display region 241 in any arrangement. For example, as shown in FIG. 2, the plurality of focused targets are extracted as arranged in the specified region (for example, contact region 214), and the plurality of focused targets may be arranged in the display region 241 after the distance between each of the plurality of focused targets is enlarged/reduced, or without changing the distance, while the arrangement between each of the plurality of focused targets is still maintained. When only one focused target is extracted by the focused target extraction unit 120, the display control unit 140 may perform control so as not to display the focused target extracted by the focused target extraction unit 120 in the display region 241. When the selection operation detection unit 110 detects selection operation performed with the manipulation object OP before a predetermined period of time passes since the specified region detection unit 110 detects a specified region, the display control unit 140 may perform control so as not to display the plurality of focused targets extracted by the focused target extraction unit 120 in the display region 241.

The information processing apparatus 100A may further include a display unit 150. The display unit 150 is made of, for example, a display device. The display unit 150 has a display region 241, and has a function of displaying in the display region 241 according to the control performed by the display control unit 140. In addition, the display unit 150 is used in a case where various kinds of information are displayed when an execution unit 180 executes predetermined processing. In the example explained with reference to FIG. 2, the display unit 150 can display input keys, a cursor CU, a window WI, an input field IN in the display region 241 in accordance with the control performed by the display control unit 140.

The information processing apparatus 100A may further include a storage unit, not shown. The storage unit, not shown, is made of, for example, a storage device such as a nonvolatile memory. The storage unit has a function of storing programs for realizing the focused target extraction unit 120, the selection candidate extraction unit 130, the display control unit 140, a selection unit 170, the execution unit 180, and the like, and has a function of storing various kinds of data and the like that are used when the programs are executed. Further, the storage unit can also store various kinds of threshold values.

The focused target extraction unit 120, the selection candidate extraction unit 130, the display control unit 140, the selection unit 170, the execution unit 180, and the like are made of, for example, a CPU (Central Processing Unit) and a RAM (Random Access Memory), and the functions thereof are realized by causing a CPU to extract programs stored in the storage unit, not shown, into the RAM and execute the programs. However, the configuration is not limited to the above example. Some of the focused target extraction unit 120, the selection candidate extraction unit 130, the display control unit 140, the selection unit 170, and the execution unit 180 may be made of dedicated hardware.

In addition, the information processing apparatus 100A may further include a selection operation detection unit 160, the selection unit 170, the execution unit 180, and the like. The selection operation detection unit 160, the selection unit 170, and the execution unit 180 will be explained later in detail.

1-4. Hardware Configuration of Information Processing Apparatus

Figure 4:
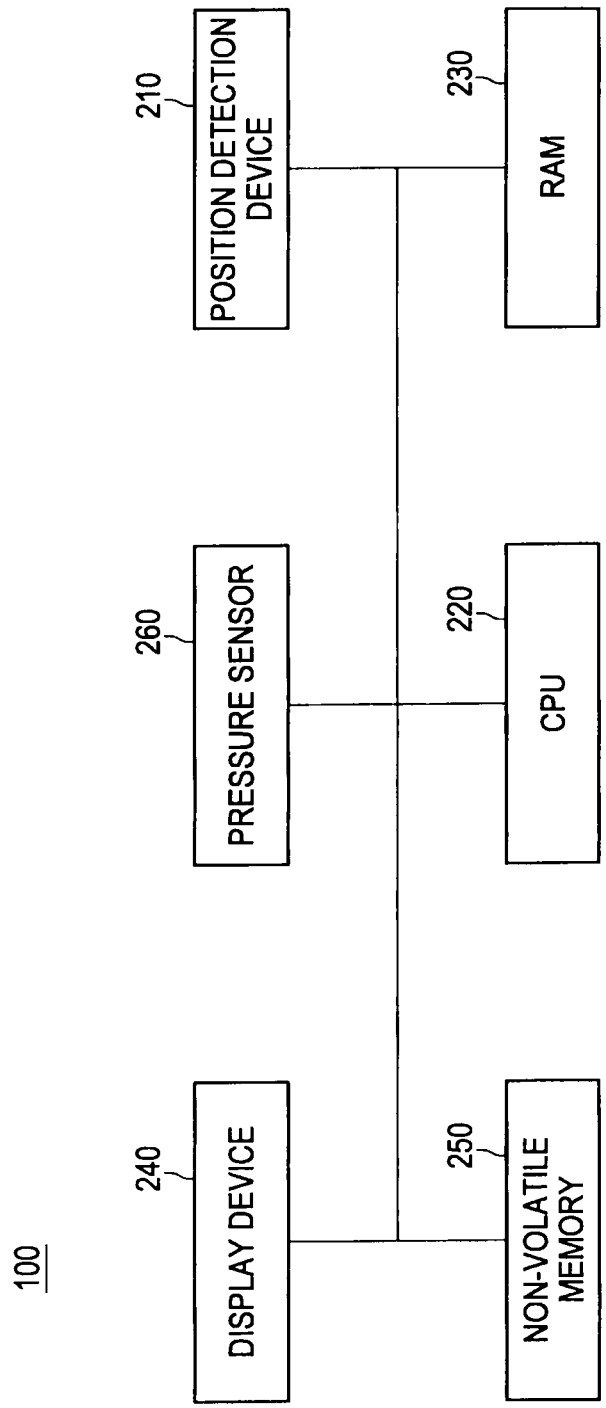
FIG. 4 is a hardware configuration diagram illustrating the information processing apparatus according to the embodiment.

FIG. 4 is a hardware configuration diagram illustrating an information processing apparatus according to the first embodiment of the present disclosure. As shown in FIG. 4, the information processing apparatus 100A according to the first embodiment of the present disclosure includes the position detection device 210, a CPU 220, a RAM 230, a display device 240, a nonvolatile memory 250, a pressure sensor 260, and the like.

The position detection device 210 has the position detection surface 211, and has a function of detecting a proximity coordinate or a contact coordinate of the manipulation object OP with respect to the position detection surface 211. When the position detection device 210 can detect the predetermined parameter which changes according to the distance between the position detection surface 211 and the manipulation object OP, the region in which the detected predetermined parameter is more than the threshold value is detected as a specified region. When the position detection device 210 can detect a region in which the manipulation object OP is in contact with the position detection surface 211, the detected region may be used as a specified region.

For example, an electrostatic touch panel can be used as the position detection device 210. According to the electrostatic touch panel, a change of capacitance can be detected as the predetermined parameter which changes according to the distance between the position detection surface 211 and the manipulation object OP. In addition, for example, an optical touch panel can be used as the position detection device 210. According to the optical touch panel, a change of intensity of incident light can be detected as the predetermined parameter which changes according to the distance between the position detection surface 211 and the manipulation object OP.

In addition, for example, a USB (Universal Serial Bus) camera can be used as the position detection device 210. When the USB camera is used as the position detection device 210, a device other than the position detection device 210 may detect the predetermined parameter that is used to determine whether, for example, the manipulation object OP is in contact with or in proximity to the position detection device 210.

The CPU 220 functions as an arithmetic processing unit and a control device, and controls overall operation in the information processing apparatus 100A or a portion thereof in accordance with various programs stored in the nonvolatile memory 250 and the RAM 230.

The RAM 230 stores, for example, programs used by the CPU 220 and parameters changing as necessary during the execution.

The display device 240 is made of a device capable of visually notifying information to a user such as an LCD (Liquid Crystal Display) and an organic EL (Electroluminescence) display device. The display device 240 outputs, for example, results obtained from various kinds of processing performed by the information processing apparatus 100A. More specifically, the display device 240 displays, as a text or an image in the display region 241, results obtained from various kinds of processing performed by the information processing apparatus 100A. Further, the display device 240 may be provided in the information processing apparatus 100A, or may be present outside the information processing apparatus 100A.

The nonvolatile memory 250 is a data storage device, and is made of, for example, a magnetic storage device such as an HDD (Hard Disk Drive), a semiconductor storage device, an optical storage device, or a magneto optical storage device. The nonvolatile memory 250 stores various kinds of data and programs executed by the CPU 220.

The pressure sensor 260 has a function of detecting pressing force applied by the manipulation object OP. The pressing force applied by the manipulation object OP that is detected by the pressure sensor 260 is, for example, pressing force per unit area applied by the manipulation object OP. When the pressing force applied by the manipulation object OP is more than a threshold value, the pressure sensor 260 may output a signal indicating to that effect. By detecting this signal, the information processing apparatus 100A can determine that the pressing force applied by the manipulation object OP is more than the threshold value, and can determine that, for example, selection operation is performed with the manipulation object OP.

The example of hardware configuration capable of realizing the functions of the information processing apparatus 100A according to the embodiment of the present disclosure has been hereinabove explained. Each of the above constituent elements may be made of a generally-used member, or may be made of hardware dedicated for the function of each constituent element. Therefore, the used hardware configuration may be changed as necessary in accordance with the state of the art at the time when the embodiment of the present disclosure is carried out.

An information processing apparatus 100A according to another embodiment may be realized with a similar hardware configuration.

1-5. Example of Display after Manipulation Object is Moved

Figure 5:
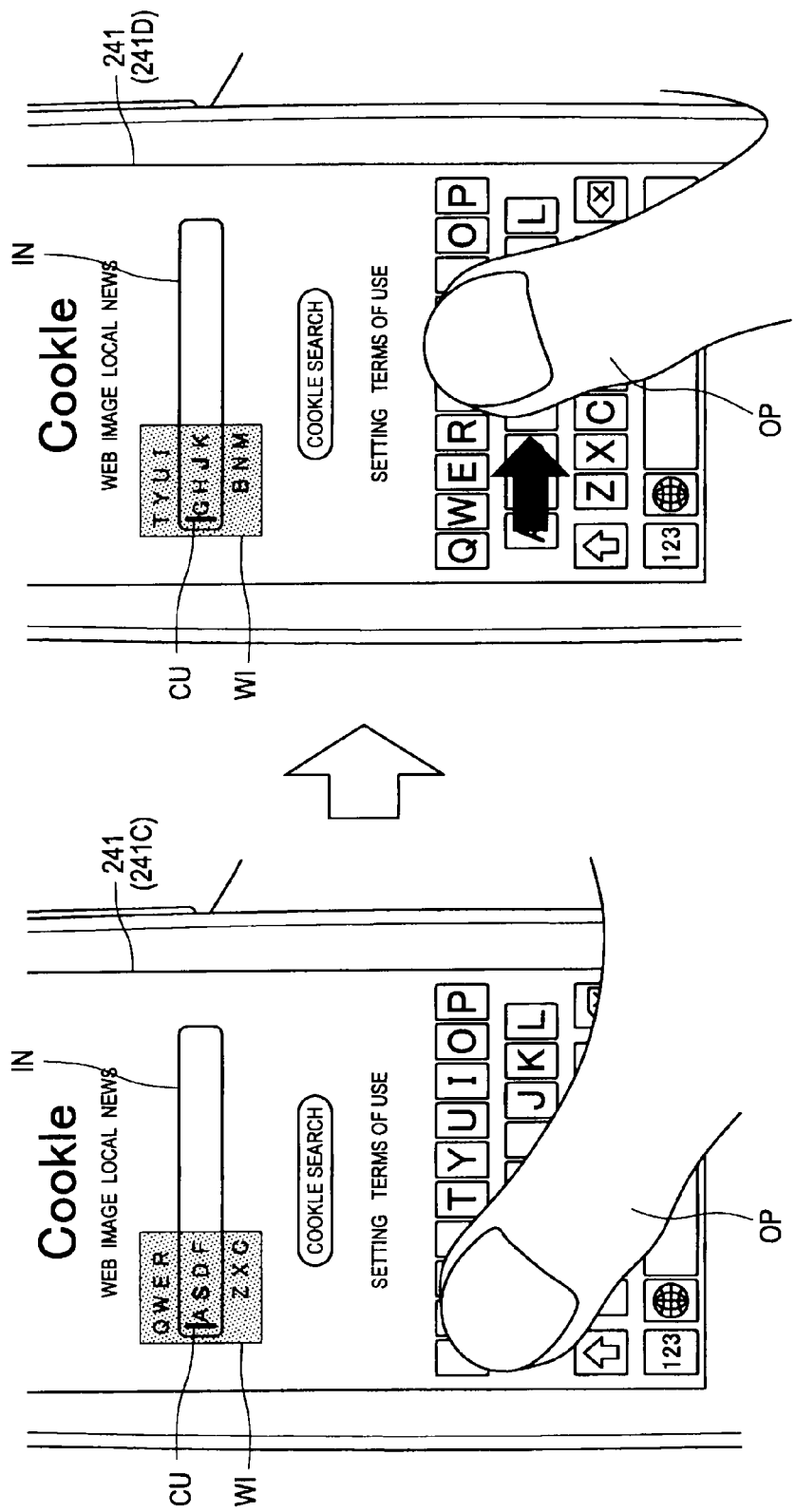
FIG. 5 is a view illustrating an example of display after the manipulation object is moved in the example shown in FIG. 2.

FIG. 5 is a view illustrating an example of display after the manipulation object is moved in the example shown in FIG. 2. As shown in FIG. 5, when a user moves the manipulation object OP, the information processing apparatus 100A displays focused targets and a selection candidate in a window WI of the display region 241 in accordance with the position of the manipulation object OP. In the example shown in FIG. 5, before the user moves the manipulation object OP, the display control unit 140 performs control so that the keys "Q", "W", "E", "R", "A", "S", "D", "F", "Z", "X", "C" extracted as the focused targets are displayed in a window WI of a display region 241C, and the display control unit 140 performs control so that the key "S" extracted as the selection candidate is displayed in an emphasized manner. The proximity of the closest key to a perceived tactile center of contact area made by the manipulation object OP to a different key is related to an amount of movement of the manipulation object with respect to the interaction area.

On the other hand, after the user moves the manipulation object OP, the specified region detection unit 110 detects a new specified region. The focused target extraction unit 120 extracts keys "T", "Y", "U", "I", "G", "H", "J", "K", "B", "N", "M" as focused targets on the basis of the specified region, and the selection candidate extraction unit 130 extracts the key "J" as a selection candidate. Then, the display control unit 140 performs control so that the keys "T", "Y", "U", "I", "G", "H", "J", "K", "B", "N", "M" extracted as the focused targets are displayed in a window WI of a display region 241D, and the display control unit 140 performs control so that the key "J" extracted as the selection candidate is displayed in an emphasized manner.

1-6. Example of Display During Key Input Operation

Figure 6:
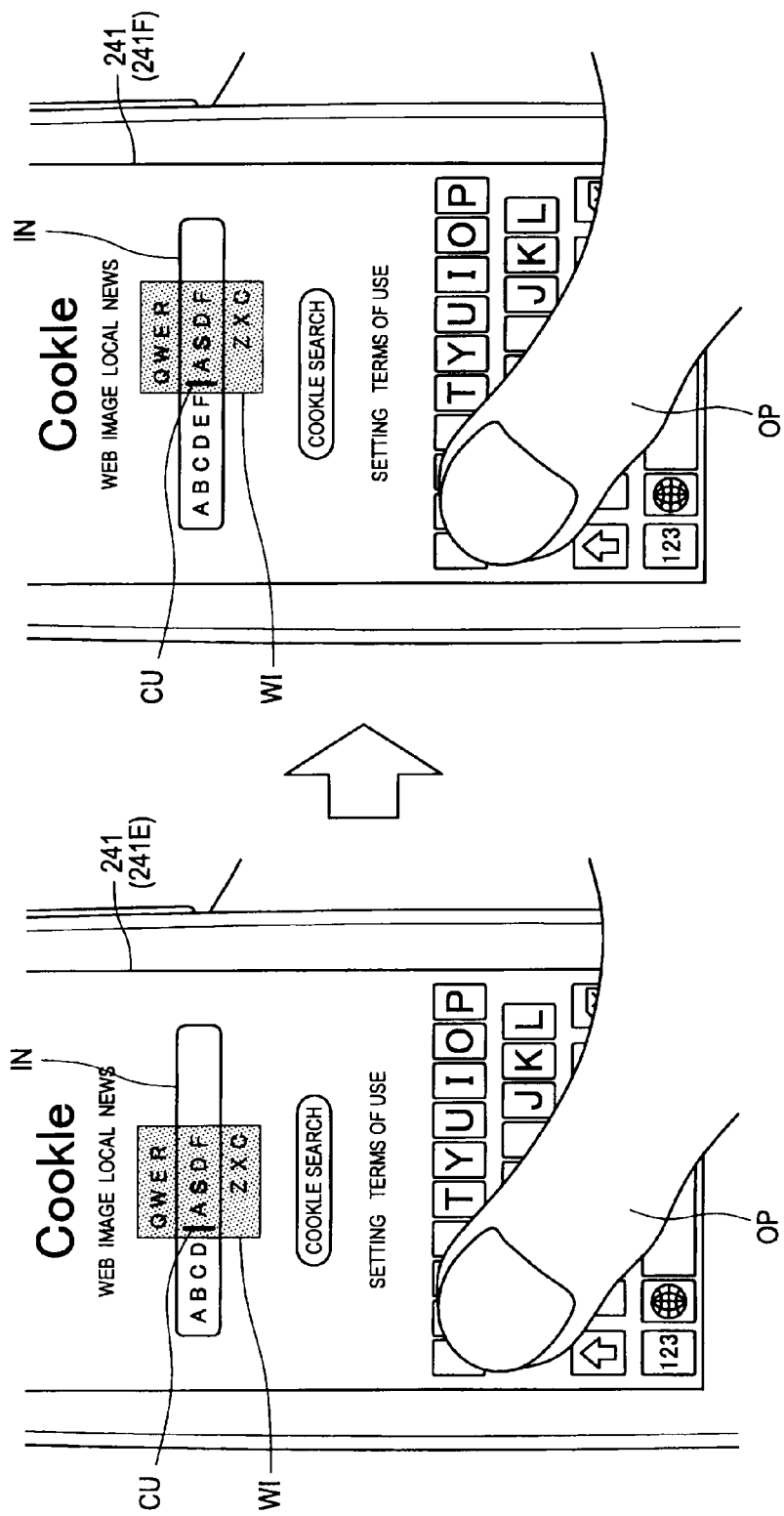
FIG. 6 is a view illustrating an example of display during key input operation in the example shown in FIG. 2.

FIG. 6 is a view illustrating an example of display during key input operation in the example shown in FIG. 2. In this case, the user can input characters or symbols into the input field IN by performing selection operation. In other words, the information processing apparatus 100A may further include a selection operation detection unit 160 and a selection unit.

The selection operation detection unit 160 has a function of detecting selection operation performed with the manipulation object OP. The selection operation detection unit 160 includes, for example, a pressure sensor 260, and detects selection operation performed with the manipulation object OP in accordance with pressing force applied by the manipulation object OP that is detected by the pressure sensor 260. For example, when the pressing force applied by the manipulation object OP that is detected by the pressure sensor 260 is determined to be more than the threshold value, the selection operation detection unit 160 can detect the selection operation performed with the manipulation object OP.

The selection unit 170 has a function of selecting the selection candidate extracted by the selection candidate extraction unit 130 as a selection result when the selection operation detection unit 160 detects the selection operation.

When the information processing apparatus 100A is applied to a software keyboard, a plurality of options are constituted by characters and symbols. For example, in this case, the execution unit 180 can execute predetermined processing by setting a character or a symbol selected by the selection unit 170 into an input field IN of a display region 241E. The execution unit 180 inputs "ABCD" selected by the selection unit 170 into the input field IN of the display region 241E.

The position where the plurality of focused targets extracted by the focused target extraction unit 120 are displayed is not particularly limited. For example, the plurality of focused targets extracted by the focused target extraction unit 120 may be displayed at a fixed position. For example, the plurality of focused targets extracted by the focused target extraction unit 120 may be displayed at a position according to the position of the cursor CU (or insertion point cursor). In other words, the display control unit 140 can perform control so that the plurality of focused targets extracted by the focused target extraction unit 120 are displayed at a position according to the position of the cursor CU. In the example shown in FIG. 6, a window WI of a display region 241F moves to follow the position of the cursor CU, and the plurality of focused targets are displayed in the window WI.

1-7. Flow of Operation Performed by Information Processing Apparatus (when Key Input Operation is Performed)

Figure 7:
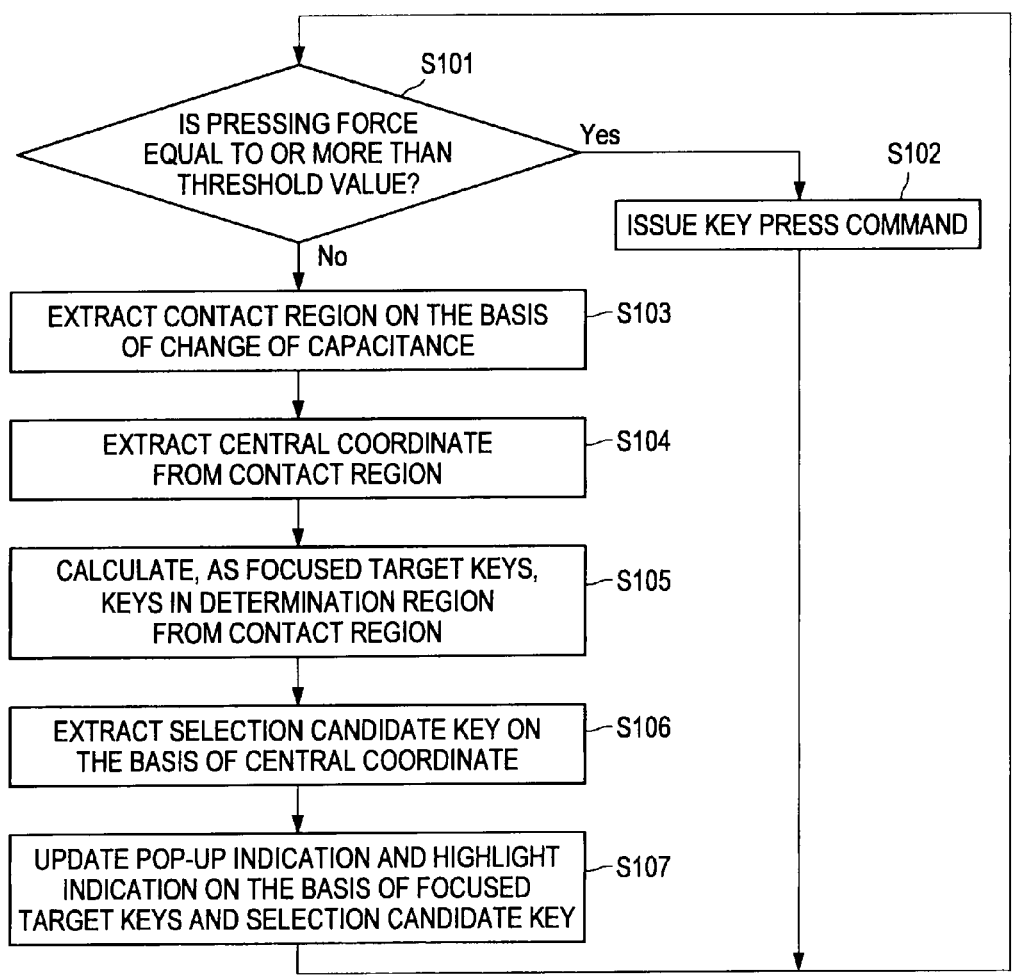
FIG. 7 is a flowchart illustrating a flow of operation performed by the information processing apparatus according to the embodiment that is applied to the key input operation with the software keyboard.

FIG. 7 is a flowchart illustrating a flow of operation performed by the information processing apparatus according to the first embodiment of the present disclosure that is applied to the key input operation with the software keyboard. As shown in FIG. 7, the selection operation detection unit 160 of the information processing apparatus 100A according to the first embodiment of the present disclosure detects pressing force applied by the manipulation object OP. When the pressing force is determined to be equal to or more than the threshold value ("Yes" in step S101), the selection unit 170 determines that selection operation is performed with the manipulation object OP and issues a key press command (step S102), and then step S101 is subsequently performed.

When the pressing force is determined to be less than the threshold value ("No" in step S101), the specified region detection unit 110 extracts the contact region 214 on the basis of the change of capacitance on the position detection surface 211 caused by the manipulation object OP (step S103), and extracts the central coordinate 212 from the contact region 214 (step S104). The focused target extraction unit 120 calculates, as focused target keys, keys in the determination region from the contact region 214 (step S105), and the selection candidate extraction unit 130 extracts a selection candidate key from the focused target keys on the basis of the central coordinate 212 (step S106).

The display control unit 140 updates a pop-up indication and a highlight indication on the basis of the focused target key and the selection candidate key (step S107), and then step S101 is subsequently performed. In the above example, the pop-up indication corresponds to an indication of the focused target keys in the window WI, and the highlight (or bold) indication corresponds to an emphasized indication of the selection candidate key in the window WI.

1-8. Pin Selection Operation on Map

Figure 8:
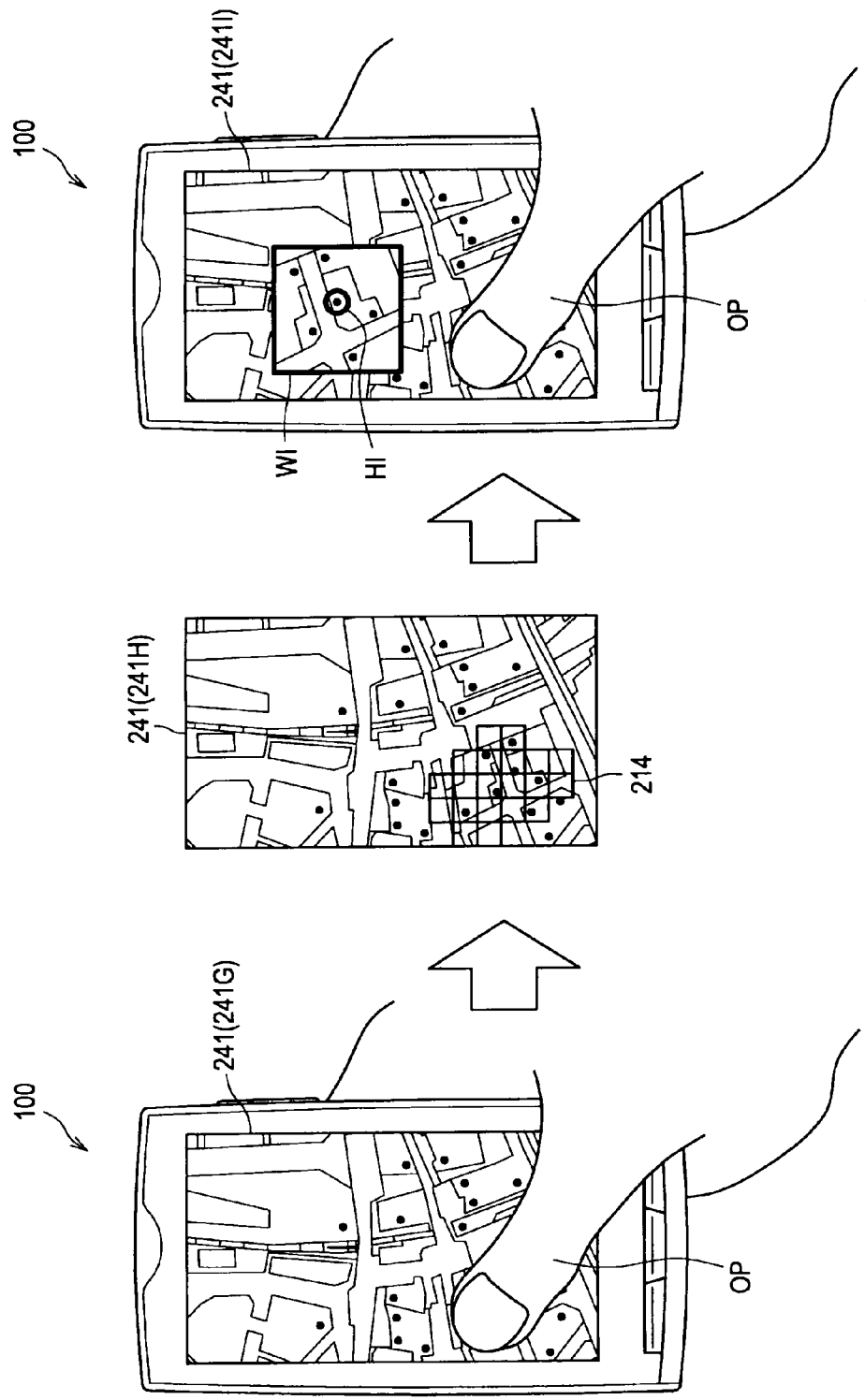
FIG. 8 is a view illustrating an example where the information processing apparatus according to the embodiment is applied to pin selection operation on a map.

FIG. 8 is a view illustrating an example where the information processing apparatus 100A according to the first embodiment of the present disclosure is applied to pin selection (or geographic feature) operation on a map. As shown in FIG. 8, a user is trying to select, with the manipulation object OP, a pin on a map displayed in a display region 241G of the information processing apparatus 100A. When the user brings the manipulation object OP into contact with or in proximity with the position detection surface 211E, the specified region detection unit 110 extracts the contact region 214 and the central coordinate 212.

For example, the focused target extraction unit 120 can extract, as a focused target, a pin in the contact region 214 of a display region 241H. For example, as shown in FIG. 8, the selection candidate extraction unit 130 can extract, as a selection candidate, a pin located closest to the position of the central coordinate 212. For example, the display control unit 140 can display the pin extracted as the focused target in such a manner that the extracted pin is displayed separately from the already displayed pins. In a display region 241I, the pin extracted as the focused target is controlled by the display control unit 140 so that the extracted pin is displayed in the window WI. In addition to pins, the geographic feature may be emphasized with a color, scale (size), or geometric marker.

As shown in the display region 241H, for example, the display control unit 140 can perform control so as to apply a highlight indication HI to the pin extracted as the selection candidate. When the selection operation detection unit 160 detects selection operation performed with the manipulation object OP, the execution unit 180 executes processing according to the pin extracted as the selection candidate. For example, the execution unit 180 performs control so as to display information about the pin extracted as the selection candidate by the selection candidate extraction unit 130.

In this case, the focused target extraction unit 120 extracts the pins in the contact region 214 of the display region 241H as the focused targets, but the method for extracting the focused targets is not limited to the above example. For example, the focused target extraction unit 120 may calculate the determination region on the basis of the concentration of the plurality of options in the specified region (for example, contact region 214) detected by the specified region detection unit 110. In this case, the focused target extraction unit 120 can extract the plurality of options in the determination region as the plurality of focused targets. For example, the focused target extraction unit 120 calculates, as the determination region, a region having a high concentration of the plurality of options in the specified region (for example, contact region 214) detected by the specified region detection unit 110.

As described above, when the display control unit 140 performs control so as to display the plurality of focused targets extracted by the focused target extraction unit 120 in the display region 241, the display control unit 140 may arrange the plurality of focused targets in the display region 241 in any arrangement. For example, as shown in FIG. 8, the plurality of focused targets are extracted by clipping the specified region (for example, contact region 214) as the display portion, and the plurality of focused targets may be arranged in the window WI of the display region 241 after the clipped display portion is enlarged/reduced, or without any change.

Figure 9:
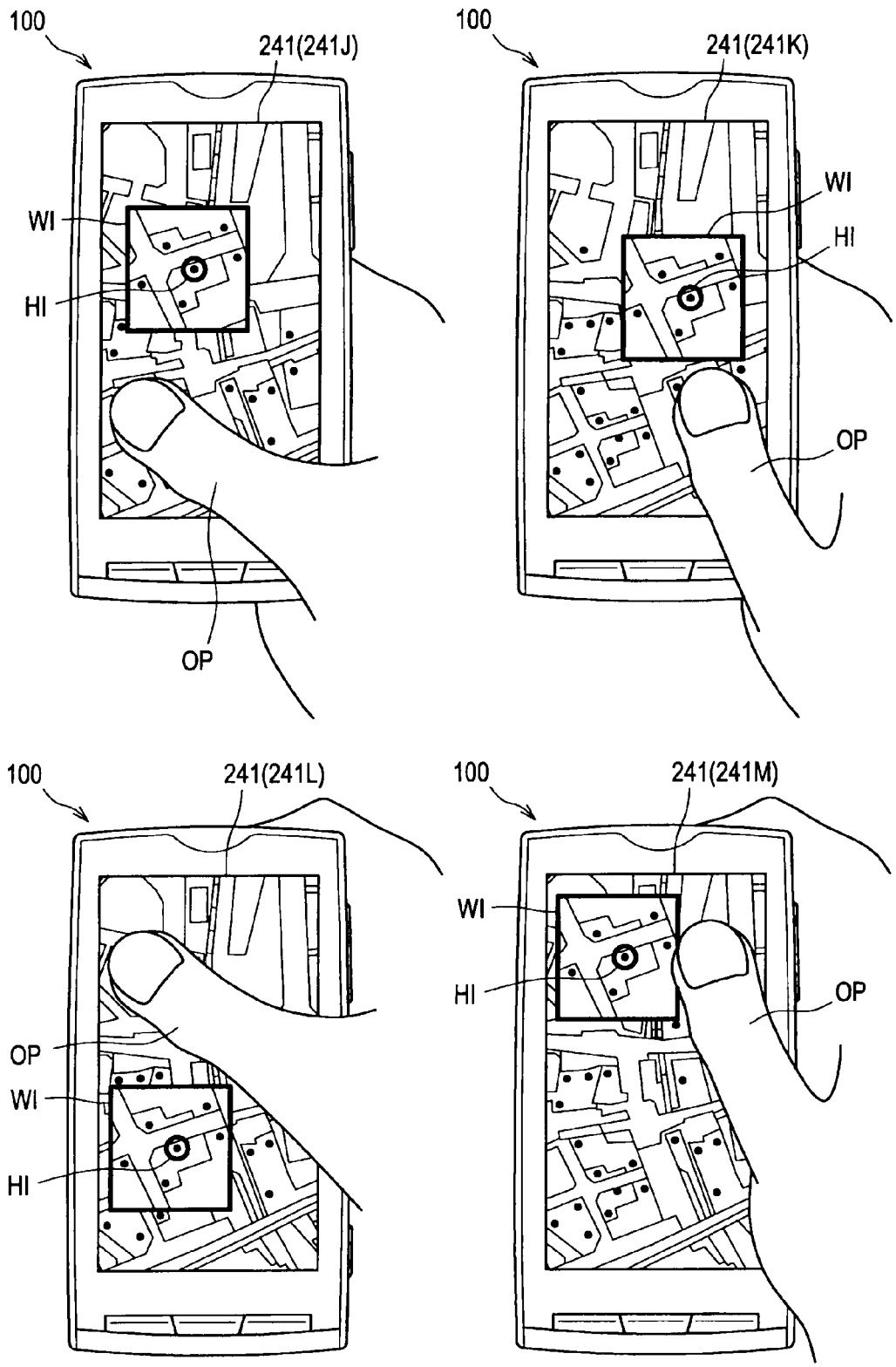
FIG. 9 is a view illustrating an example of display that changes according to the position of the manipulation object in the example shown in FIG. 8.

1-9. Example of Display that Changes According to Position of Manipulation Object FIG. 9 is a view illustrating an example of display that changes according to the position of the manipulation object in the example as shown in FIG. 8. As shown in FIG. 9, a user is trying to select, with the manipulation object OP, a pin on a map displayed in the display region 241 of the information processing apparatus 100A. When the user brings the manipulation object OP into contact with or in proximity to a lower left side of a display region 241J, the display control unit 140 performs control so that the window WI extracted by the focused target extraction unit 120 is displayed at a position where the window WI does not overlap the manipulation object OP at the lower left side.

Likewise, when the user brings the manipulation object OP into contact with or in proximity to a lower right side of a display region 241K, the display control unit 140 performs control so that the window WI extracted by the focused target extraction unit 120 is displayed at a position where the window WI does not overlap the manipulation object OP at the lower right side. When the user brings the manipulation object OP into contact with or in proximity to an upper left side of a display region 241L, the display control unit 140 performs control so that the window WI extracted by the focused target extraction unit 120 is displayed at a position where the window WI does not overlap the manipulation object OP at the upper left side. When the user brings the manipulation object OP into contact with or in proximity to an upper right side of a display region 241M, the display control unit 140 performs control so that the window WI extracted by the focused target extraction unit 120 is displayed at a position where the window WI does not overlap the manipulation object OP at the upper right side.

As described above, the display control unit 140 calculates, from the display region 241, the region that does not overlap the specified region detected by the specified region detection unit 110 but still fits in the display region 241, and can perform control so that the plurality of focused targets extracted by the focused target extraction unit 120 are displayed in the calculated region. As described above, this prevents the plurality of focused targets from being covered by the manipulation object OP and invisible to the user.

1-10. Flow Of Operation Performed by Information Processing Apparatus (when Pin is Selected on Map)

Figure 10:
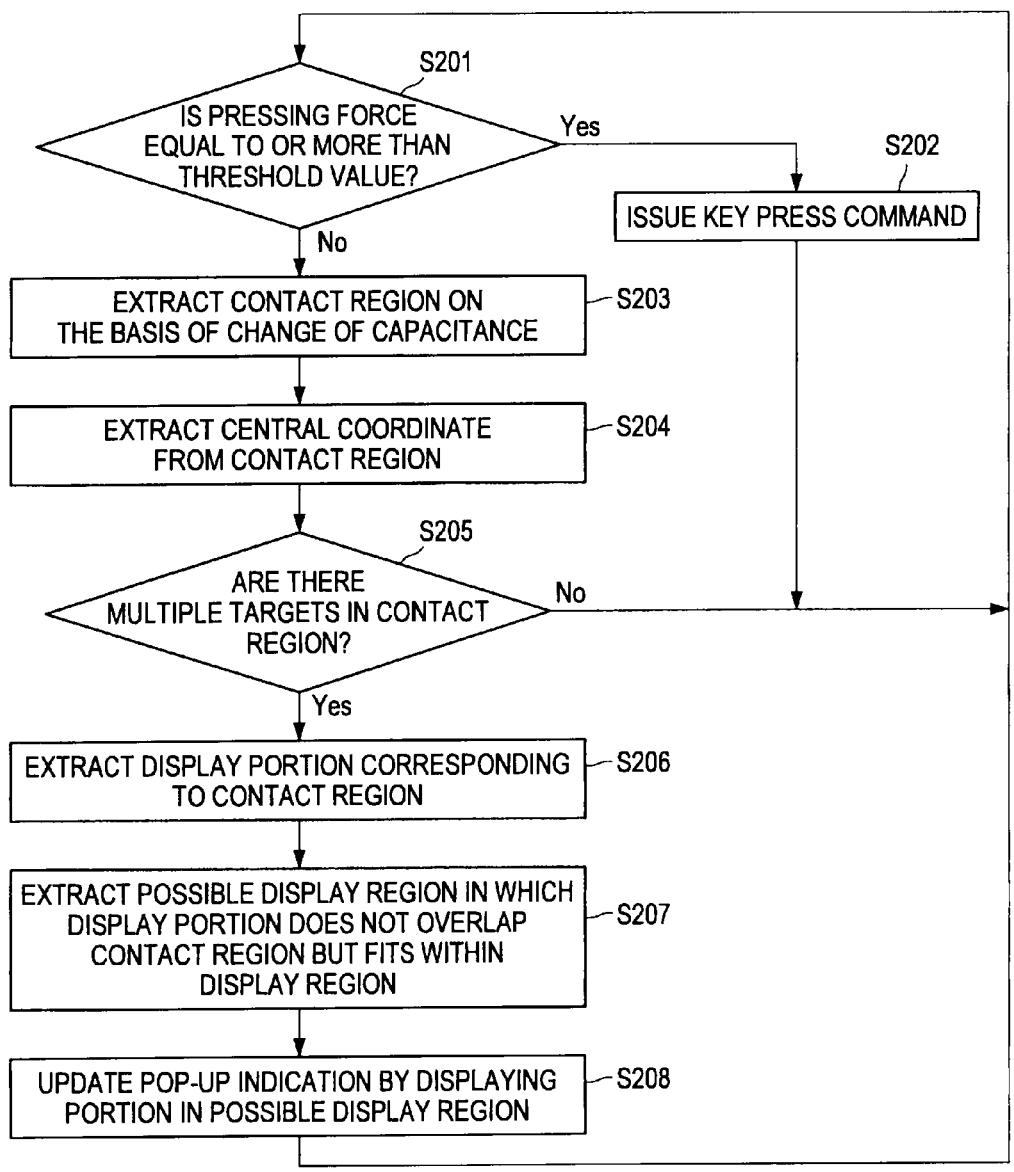
FIG. 10 is a flowchart illustrating a flow of operation performed by the information processing apparatus according to the embodiment that is applied to the pin selection operation on the map.

FIG. 10 is a flowchart illustrating a flow of operation performed by the information processing apparatus according to the embodiment that is applied to the pin selection operation on the map. As shown in FIG. 10, the selection operation detection unit 160 of the information processing apparatus 100A according to the first embodiment of the present disclosure detects pressing force applied by the manipulation object OP. When the pressing force is determined to be equal to or more than the threshold value ("Yes" in step S201), the selection unit 170 determines that selection operation is performed with the manipulation object OP and issues a key press command (step S202), and then step S201 is subsequently performed.

When the pressing force is determined to be less than the threshold value ("No" in step S201), the specified region detection unit 110 extracts the contact region 214 on the basis of the change of capacitance on the position detection surface 211 caused by the manipulation object OP (step S203), and extracts the central coordinate 212 from the contact region 214 (step S204). When the focused target extraction unit 120 does not find a plurality of focused targets in the contact region 214 ("No" in step S205), the focused target extraction unit 120 returns to step S201. When the focused target extraction unit 120 finds a plurality of focused targets in the contact region 214 ("Yes" in step S205), the focused target extraction unit 120 extracts a display portion corresponding to the contact region 214 (step S206).

The display control unit 140 extracts a possible display region in which the display portion does not overlap the contact region 214 but fits within the display region 241 (step S207), and the display control unit 140 performs control so as to update a pop-up indication by displaying the display portion in the possible display region (step S208).

Then, step S201 is subsequently performed. In the above example, the pop-up indication corresponds to an indication of the focused target keys in the window WI.

2. Second Embodiment

2-1. Functions of Generally-Available Information Processing Apparatus Serving as Basis FIG. 11 is a view illustrating functions of a generally-available information processing apparatus serving as a basis of an information processing apparatus according to the second embodiment of the present disclosure. As shown in FIG. 11, a user is trying to adjust, with the manipulation object OP, a reproduction position of a motion picture reproduction screen displayed in a display region 241N of an information processing apparatus 100B. The user tries to grab and move a grab GB displayed in a display region 241O in order to change the reproduction position, but at this occasion, it is highly possible that the specified position where the user thinks he/she has grabbed the grab GB may be displaced from the position of the grab GB.

In such a case, there is an issue in that, when the user no longer wants to move the grab GB, the reproduction position is displaced for a distance equivalent to the displacement thereof. The information processing apparatus 100B according to the second embodiment of the present disclosure can prevent such movement of the grab GB unintended by the user.

2-2. Functions of Information Processing Apparatus

FIG. 12 is a view illustrating functions of the information processing apparatus according to the second embodiment of the present disclosure. As shown in FIG. 12, when the manipulation object OP is brought into contact with or in proximity to a display region 241P, the information processing apparatus 100B according to the second embodiment of the present disclosure determines whether the grab GB fits within the contact region 214 or not. When the information processing apparatus 100B according to the second embodiment of the present disclosure determines that the grab GB fits within the contact region 214, the information processing apparatus 100B determines that the user is trying to move the grab GB with the manipulation object OP, and accordingly does not move the grab GB to the central coordinate 212A.

Thereafter, when the information processing apparatus 100B determines that the user performs operation with the manipulation object OP to actually move the grab GB as shown in FIG. 12, the information processing apparatus 100B may move the grab from a central coordinate 212A, i.e., a coordinate at a start point of the moving operation, to a central coordinate 212B, i.e., a coordinate at an end point of the moving operation.

2-3. Functional Configuration of Information Processing Apparatus

Figure 13:
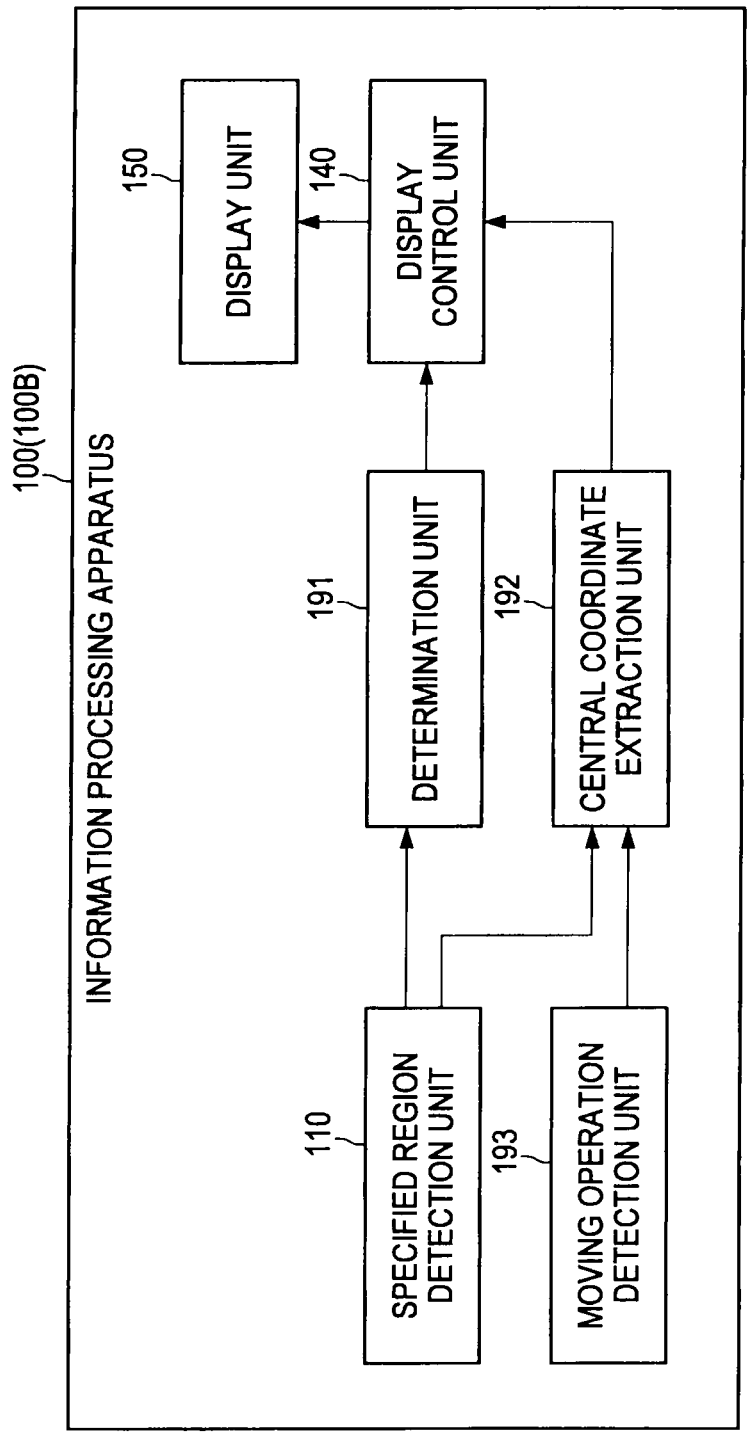
FIG. 13 is a view illustrating a functional configuration of the information processing apparatus according to the embodiment.

FIG. 13 is a view illustrating a functional configuration of the information processing apparatus 100B according to the second embodiment of the present disclosure. As shown in FIG. 13, the information processing apparatus 100B according to the second embodiment of the present disclosure includes at least a specified region detection unit 110, a determination unit 191, and a display control unit 140. The functions of the specified region detection unit 110 are not particularly different from the functions of the specified region detection unit 110 according to the first embodiment of the present disclosure, and therefore explanation thereabout is omitted.

The determination unit 191 has a function of determining whether there is any movement target in a predetermined range on the basis of a specified region detected by the specified region detection unit 110. The predetermined range based on the specified region detected by the specified region detection unit 110 may be the specified region itself detected by the specified region detection unit 110, or may be the determination region calculated on the basis of the specified region detected by the specified region detection unit 110. The movement target is moved on the basis of moving operation performed with the manipulation object OP, and is moved to a position specified by proximity operation or contact operation.

The display control unit 140 has the following function. The display control unit 140 performs control so as to move the movement target when the determination unit 191 determines that there is no movement target in the predetermined range, and the display control unit 140 performs control so as to limit movement of the movement target when the determination unit 191 determines that a movement target exists in the predetermined range. Limiting movement of the movement target means, for example, stopping movement of the movement target.

The information processing apparatus 100B may further include a central coordinate extraction unit 192. The central coordinate extraction unit 192 has a function of extracting the central coordinate 212 in accordance with principle similar to the principle according to which the information processing apparatus 100A according to the first embodiment of the present disclosure extracts the central coordinate 212. When the determination unit 191 determines that, for example, there is no movement target in the predetermined range, the display control unit 140 may perform control so as to move the movement target to the central coordinate 212 extracted by the central coordinate extraction unit 192.

The information processing apparatus 100B may further include a moving operation detection unit 193. The moving operation detection unit 193 has a function of detecting moving operation performed with the manipulation object OP on the position detection surface 211. The moving operation with the manipulation object OP may be performed by bringing the manipulation object OP into proximity to the position detection surface 211 or by bringing the manipulation object OP into contact with the position detection surface 211. The moving operation corresponds to, for example, operation for grabbing and moving the grab GB, i.e., an example of movement target.

The information processing apparatus 100A may further include a display unit 150. The display unit 150 is made of, for example, a display device. The display unit 150 has a display region 241, and has a function of displaying in the display region 241 according to the control performed by the display control unit 140. In the example explained with reference to FIG. 12, the display unit 150 can display a motion picture reproduction screen, a grab GB, and the like in the display region 241 in accordance with the control performed by the display control unit 140.

The information processing apparatus 100B may further include a storage unit, not shown. The storage unit, not shown, is made of, for example, a storage device such as a nonvolatile memory. The storage unit has a function of storing programs for realizing the determination unit 191, the central coordinate extraction unit 192, the display control unit 140, and the like, and has a function of storing various kinds of data and the like that are used when the programs are executed. Further, the storage unit can also store various kinds of threshold values.

2-4. Flow Of Operation Performed by Information Processing Apparatus (Preventing Malfunction)

Figure 14:
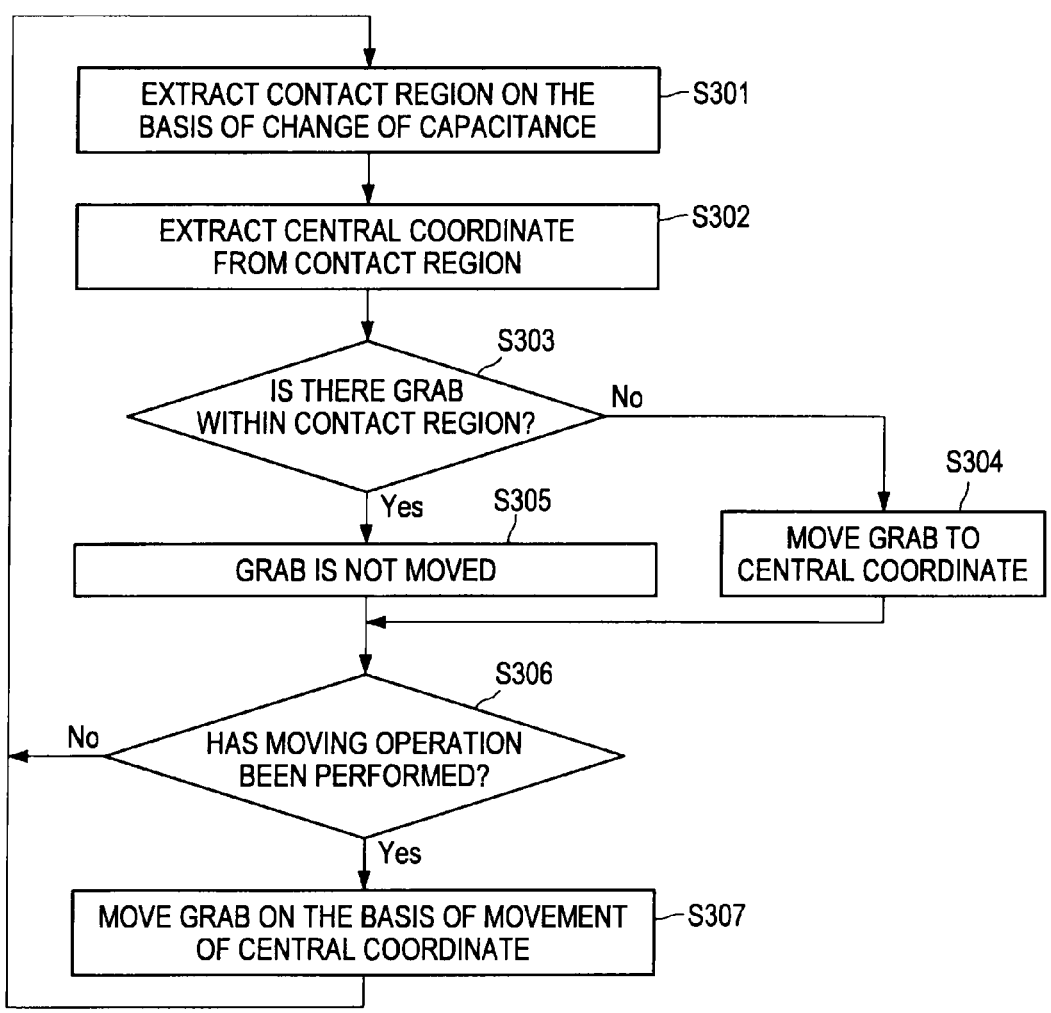
FIG. 14 is a flowchart illustrating a flow of operation performed by the information processing apparatus according to the embodiment.

FIG. 14 is a flowchart illustrating a flow of operation performed by the information processing apparatus 100B according to the second embodiment of the present disclosure. As shown in FIG. 14, the specified region detection unit 110 of the information processing apparatus 100B according to the second embodiment of the present disclosure extracts the contact region 214 on the basis of the change of capacitance on the position detection surface 211 caused by the manipulation object OP (step S301), and the central coordinate extraction unit 192 extracts the central coordinate 212 from the contact region 214 (step S302).

The determination unit 191 determines whether there is any grab GB within the contact region 214 (step S303). When the determination unit 191 determines that there is no grab GB within the contact region 214 ("No" in step S303), the display control unit 140 moves the grab GB to the central coordinate 212 (step S304), and then step S306 is subsequently performed.

When the determination unit 191 determines that there is the grab GB within the contact region 214 ("Yes" in step S303), the display control unit 140 does not move the grab GB to the central coordinate 212 (step S305), and then step S306 is subsequently performed. Subsequently, when moving operation is performed with the manipulation object OP ("Yes" in step S306), the display control unit 140 moves the grab GB on the basis of movement of the central coordinate 212 (step S307), and then step S301 is subsequently performed. When no moving operation is performed with the manipulation object OP ("No" in step S306), the display control unit 140 returns back to step S301.

3. Modification

It should be understood by those skilled in the art that various modifications, combinations, sub-combinations and alterations may occur depending on design requirements and other factors insofar as they are within the scope of the appended claims or the equivalents thereof.

4. Conclusion

According to the first embodiment of the present disclosure, a desired option can be selected from the plurality of options in the display region while effectively using the limited display region. More particularly, according to the first embodiment of the present disclosure, a user can easily perform operation when the user selects and decides a small target.

Further, according to the first embodiment of the present disclosure, a selected target is displayed on the basis of the contact area and the operation determination region of the operation target, and a feedback is provided to a user, so that it is less likely for the user to perform erroneous operation and the user can easily perform the operation. Still further, according to the first embodiment of the present disclosure, a feedback is displayed in accordance with the contact area, and the user understands how the contact area differs depending on the way the user touches the screen, which is expected to improve the accuracy of operation through learning.

According to the second embodiment of the present disclosure, it is possible to prevent movement of the movement target unintended by a user.

The present disclosure contains subject matter related to that disclosed in Japanese Priority Patent Application JP 2010-188126 filed in the Japan Patent Office on Aug. 25, 2010, the entire content of which is hereby incorporated by reference.

What is claimed is:

1. An information processing apparatus, comprising:
circuitry configured to
  detect an interaction area of a position detection surface specified by a single static point of contact on the detection surface by a manipulation object;
  calculate a predetermined shape as a region corresponding to the interaction area based on the single static point of contact,
  determine a plurality of focused targets that overlap the predetermined shape;
  display a subset of the plurality of focused targets determined based on a distance between each of the plurality of focused targets and a center of the predetermined shape, in a window that overlaps an input field and that has a same number of rows above and below boundaries of the input field, the window not overlapping the interaction area, the input field being separated from the interaction area, the subset of the plurality of focused targets being fewer than all of the plurality of focused targets;
  determine a selection candidate from the plurality of focused targets; and
  emphasize the selection candidate relative to others of the plurality of focused targets,
  wherein the plurality of focused targets include alphanumeric characters,
  said circuitry displays the selection candidate as an alphanumeric character emphasized, as compared to others of the plurality of focused targets, by at least one of an insertion-point cursor and bold text, and
  the window in which the plurality of focused targets is displayed moves when the selection candidate is selected.

2. The information processing apparatus of claim 1, wherein said circuitry is incorporated into a wireless mobile terminal; and
said plurality of focused targets include keys of a software keyboard.

3. The information processing apparatus of claim 2, wherein said plurality of focused targets are keys in a row of the software keyboard that falls within the predetermined shape.

4. The information processing apparatus of claim 2, wherein the circuitry displays the plurality of focused targets in a display area that does not overlap the keys of the wireless keyboard.

5. The information processing apparatus of claim 1, wherein the emphasis on the selection candidate changes to a different alphanumeric character in response to said circuitry detecting a change in position of the manipulation object with respect to the interaction area.

6. The information processing apparatus of claim 5, wherein a proximity of the selection candidate to the different alphanumeric character is related to an amount of movement of the manipulation object with respect to the interaction area.

7. The information processing apparatus of claim 1, wherein said circuitry includes said position detection surface.

8. The information processing apparatus of claim 7, wherein said circuitry detects pressure from said manipulation object when contacted by the manipulation object.

9. The information processing apparatus of claim 7, wherein said circuitry is responsive to change in capacitance.

10. The information processing apparatus of claim 2, wherein when said manipulation object covers from sight one or more keys of the software keyboard, the circuitry displays the at least some of the plurality of focused targets in a display region of said display that is not covered by said manipulation object.

11. An information processing method, comprising:
  detecting an interaction area of a position detection surface specified by a single static point of contact on the detection surface by a manipulation object;
  calculating a predetermined shape as a region corresponding to the interaction area based on the single static point of contact;
  determining with a computer processor a plurality of focused targets that overlap the predetermined shape;
  displaying on a display a subset of the plurality of focused targets determined based on a distance between each of the plurality of focused targets and a center of the predetermined shape, in a window that overlaps an input field and has a same number of rows above and below boundaries of the input field, the window not overlapping the interaction area, the input field being separated from the interaction area, the subset of the plurality of focused targets being fewer than all of the plurality of focused targets;
  determining with the computer processor a selection candidate from the plurality of focused targets; and
  emphasizing the selection candidate on the display relative to others of the plurality of focused targets,
  wherein the plurality of focused targets include alphanumeric characters,
  the selection candidate is displayed as an alphanumeric character emphasized, as compared to others of the plurality of focused targets, by at least one of an insertion-point cursor and bold text, and
  the window in which the plurality of focused targets are displayed moves when the selection candidate is selected.

12. The information processing method of claim 11, wherein said display is incorporated into a wireless mobile terminal; and
  said plurality of focused targets further include keys of a software keyboard.

13. The information processing method of claim 11, wherein said display is incorporated into an electronic map device.

14. A non-transitory computer readable storage device having stored therein computer readable instructions that when executed by a computer processor perform a process comprising:
  detecting an interaction area of a position detection surface specified by a single static point of contact on the detection surface by a manipulation object;
  calculating a predetermined shape as a region corresponding to the interaction area based on the single static point of contact;
  determining with a computer a plurality of focused targets that overlap the predetermined shape;
  displaying on a display a subset of the plurality of focused targets determined based on a distance between each of the plurality of focused targets and a center of the predetermined shape, in a window that overlaps an input field and that has a same number of rows above and below boundaries of the input field, the window not overlapping the interaction area, the input field being separated from the interaction area, the subset of the plurality of focused targets being fewer than all of the plurality of focused targets;
  determining a selection candidate from the plurality of focused targets; and
  emphasizing the selection candidate on the display relative to others of the plurality of focused targets,
  wherein the plurality of focused targets include alphanumeric characters,
  the selection candidate is displayed as an alphanumeric character emphasized, as compared to others of the plurality of focused targets, by at least one of an insertion-point cursor and bold text, and
  the window in which the plurality of focused targets are displayed moves when the selection candidate is selected.

15. The non-transitory computer readable storage device of claim 14, wherein said display is incorporated into a wireless mobile terminal; and
  said plurality of focused targets further include keys of a software keyboard.

16. The information processing apparatus according to claim 1, wherein within the window that overlaps the input field, a first subset of the plurality of focus targets are displayed above the input field, a second subset of the plurality of focus targets are displayed within the input field and a third subset of the plurality of focus targets are displayed below the input field.

17. The information processing apparatus of claim 7, wherein the circuitry calculates the predetermined shape based on changes in capacitate caused by the interaction object.

* * * * *